(12) United States Patent
Varakin et al.

(10) Patent No.: US 6,791,820 B1
(45) Date of Patent: Sep. 14, 2004

(54) ELECTROCHEMICAL CAPACITOR HAVING DOUBLE ELECTRICAL LAYER

(75) Inventors: Igor N. Varakin, Troitsk (RU); Alexey B. Stepanov, Troitsk (RU); Victor V. Samitin, Saratov (RU)

(73) Assignee: Universal Resources AG, Zug (CH)

( * ) Notice: Subject to any disclaimer, the term of this patent is extended or adjusted under 35 U.S.C. 154(b) by 0 days.

(21) Appl. No.: 10/363,043

(22) PCT Filed: Aug. 29, 2000

(86) PCT No.: PCT/RU00/00346

§ 371 (c)(1),
(2), (4) Date: Sep. 9, 2003

(87) PCT Pub. No.: WO02/19356

PCT Pub. Date: Mar. 7, 2002

(51) Int. Cl.[7] .................................................. H01G 9/00
(52) U.S. Cl. ........................................ 361/502; 361/504
(58) Field of Search ................................. 361/502, 504, 361/512, 525; 29/25.03

(56) References Cited

U.S. PATENT DOCUMENTS

| 4,785,380 A | 11/1988 | Harakawa et al. |
| 5,621,607 A | 4/1997 | Fahramandi et al. |

FOREIGN PATENT DOCUMENTS

| RU | 2063085 C1 | 6/1996 |
| RU | 2130211 C1 | 5/1999 |

*Primary Examiner*—Anthony Dinkins
(74) *Attorney, Agent, or Firm*—McDermott Will & Emery LLP

(57) ABSTRACT

The invention relates to electrical engineering and can be used for developing energy-storing devices. The inventive electrochemical double-layer capacitor makes it possible to develop an operable device having a long service life in addition to high specific energy and power. Said electrochemical double layer capacitor comprises a molten electrolyte (4) provided with a gelling agent.

Figure 1:
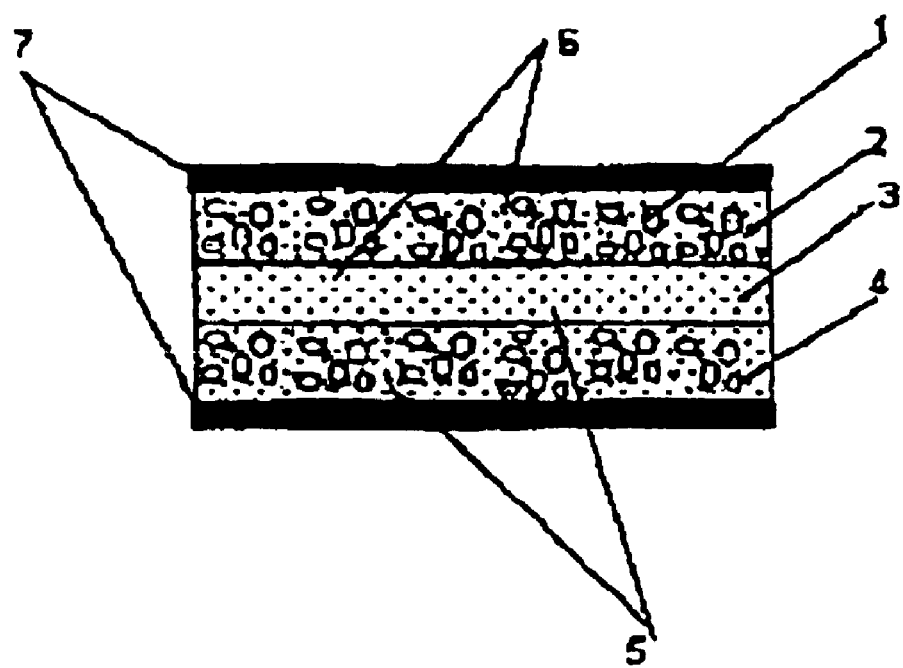

7 Claims, 1 Drawing Sheet

ELECTROCHEMICAL CAPACITOR HAVING DOUBLE ELECTRICAL LAYER

FIELD OF THE INVENTION

The invention relates to the field of electrotechnique and can be used for creating devices accumulating electrical energy and utilized:

in systems of emergency power supply when operating in a constant or compensation recharge mode;

to ensure constant power supply when employing energy sources acting periodically, i.g., in wind or helio-power industry;

in devices accumulating energy of recuperative braking at transport;

as traction batteries for electric transport.

BACKGROUND OF THE INVENTION

The action principle of the known capacitor having a double electric layer, or electro-chemical capacitor, is based on utilizing energy accumulated in the double electric layer which appears at the border of first and second class conductors (electrode—electrolyte).

As a rule, electrodes in such capacitors are made from carbon materials with high specific surface. Power capacity of the capacitor is limited by a decomposition voltage and capacitance of the double electric layer, which are inherent for an electrolyte being employed. In the case of aqueous electrolyte, the decomposition voltage is 1.23 V.

Known is a capacitor having a double electric layer, including two electrodes and aqueous electrolyte (RU 2054723 C1, H 01 G 9/00, 1996).

Use of organic solvents as electrolyte permits to raise an operating voltage of the capacitor up to 3–4 V.

Known is a capacitor having a double electric layer, including two electrodes and organic electrolyte (U.S. Pat. No. 3,700,975 A, H 01 G 9/00, 1972).

However, realization of great powers in the capacitor having a double electric layer and organic electrolyte is impeded due to low conductivity of the latter.

The analogue closest to the proposed solution by its technical essence is a capacitor having a double electric layer and including polarizable electrodes, separator and molten electrolyte (U.S. Pat. No. 5,621,607 A, H 01 G 9/04, 1993).

In the known capacitor, molten chlorides and bromides are used as electrolyte.

For example, in an electrolyte from eutectic mixture of potassium and lithium chlorides at 400–500° C., a capacitance of an electrode from activated carbon material having a surface of 900–1,200 $m^2$/g is approximately 500 F/g, and having a surface of 1,500–2,000 $m^2$/g is 600 F/g. Conductivity of this electrolyte is 1.7 Ohm/cm at 400° C. The decomposition voltage for molten aluminum and magnesium chlorides exceeds 2.5 V, for alkali metal chlorides –3.5 V, and for fluorides –5 V.

Use of molten salts is attended with solving a series of problems bound with their high corrosion aggresiveness at high temperatures in relation to structure materials of the body, electric conductors etc.

These problems are so serious that they could not create a capacitor having molten electrolyte and possessing a resource and lifetime acceptable for practice.

SUMMARY OF THE INVENTION

The problem being solved by the proposed capacitor having a double electrical layer is to create an efficient device with a great resource and lifetime in combination with high specific energy and power.

The technical result in the solution being proposed is achieved by creating a capacitor having a double electric layer, including electrodes, at least one of which is polarizable, separator and molten electrolyte, wherein in accordance with the invention a stiffener is introduced into a composition of molten electrolyte.

The invention is characterized in that as the stiffener is used an inert, fine disperse material.

Materials can be powders having particles of any form (including fibers).

The invention is characterized in that as the stiffener is used a fine dispersed material on the basis of oxides, or mixed oxides, nitrides of aluminum, or magnesium, or calcium, or strontium, or boron, or silicon, or zirconium, or yttrium, or beryllium, or mixtures thereof.

Use of molten salts, i.g., halogenides of elements of the first and second groups of the main subgroup of the periodic system as electrolyte allows to increase significantly specific capacitance of the capacitor, since a capacitance of the double electric layer of the electrode-electrolyte (melt) border exceeds significantly the same in aqueous electrolyte, and especially in organic one.

The invention is also characterized in that the second electrode is made non-polarizable and comprises, as the active material, substances capable to oxidize and reduce reversibly in electro-chemical manner in an environment of this molten electrolyte.

This permits to increase specific energy of the capacitor.

It is possible to use, as the active material, metals of the first, or second, or third groups of the periodic system, or mixtures thereof, or their alloys with carbon, or silicon, or boron, or other metals.

Metal and alloy can be formed during a charge of the capacitor.

They are used as the negative electrode.

The non-polarizable electrode comprises, as the active material, sulfides or oxides of metals from group of iron, or vanadium, or chrome, or copper, or mixtures thereof, and they are used as an active mass of the positive electrode.

Introduction of the stiffener into the composition of electrolyte allows to create a capacitor having a double electric layer (element), in which the molten electrolyte is fastened at the cost of capillary force in the active electrode material and stiffener, and does not contact with the body details. In such an element, the stiffened electrolyte can simultaneously serve as a separator.

This allows, first, to avoid corrosion of construction materials, and, second, to create a bodyless element-capacitor having a double electric layer.

The molten electrolyte may comprise various amount of stiffener, i.e., may have various degree of stiffness.

At a lower content of stiffener the electrolyte conductivity and capacitor capacitance increase, at higher content of stiffener the mechanical stability of the system is raised.

The essence of the proposed capacitor having a double electric layer is explained by the following description and examples as well as FIG. 1 which shows schematically the capacitor construction.

PREFERRED EMBODIMENTS

The capacitor having a double electric layer includes electrodes 1 and 2, at least on of which electrodes is polarizable, a separator 3, an active electrode material 4, a molten electrode 5, a stiffener 6 introduced into the electrolyte content, electric conductors 7.

Trials of the proposed construction were carried out with employment of various materials used as a stiffener, active electrode material etc.

It is expedient to use, as a material of the polarizable electrode, conductive material with high specific surface, stable in the environment of the molten electrolyte (activated carbon, carbides, nitrides, oxides, metals).

The obtained results are shown in the examples described below.

EXAMPLE 1

Electrodes of the capacitor are made from activated carbon powder having the surface of 900–1,200 $m^2/g$ (20–30 mass %) with an addition of electrolyte, and produced in the form of discs 22 mm in diameter and 1.2 mm wide. Electrolyte comprises an eutectic mixture of lithium and potassium chlorides (59 mol. % LiCl) with the melting temperature of 352° C. Powder of magnesium aluminate (40 mass %) is introduced into the electrolyte as a stiffener. A separator (i.e., a stiffened electrolyte of the same composition) is made in the form of a pressed plate 1 mm wide. Graphite discs 24 mm in diameter and 0.3 mm wide serve as electric contacts.

EXAMPLE 2

In contrast with the Example 1, the electrodes are made from activated carbon powder having specific surface 1.500–2.000 $m^2/g$.

EXAMPLE 3

In contrast with the Example 1, one electrode is made in the form of a plate from powder of ferric disulfide ($FeS_2$) with addition of electrolyte 0.5 mm wide.

EXAMPLE 4

In contrast with the Example 1, one electrode is made in the form of a plate from powder of lithium-aluminum alloy (2–4 mass % of lithium) 0.5 mm wide.

Industrial Applicability

Characteristics of capacitors at 400° C. in accordance with the set forth examples are shown in the Table.

On the basis of the proposed capacitor having a double electric layer it is possible to create a battery of bipolar construction, including as many elements combined in a single body as is wished to obtain a necessary voltage. Absence of bodies for each element will facilitate significantly a battery construction and reduce its weight.

TABLE

Characteristics of capacitors described in the Examples

| Parameters | Example 1 | Example 2 | Example 3 | Example 4 |
|---|---|---|---|---|
| Maximum voltage, V | 3.0 | 3.0 | 2.0 | 3.0 |
| Capacitance, F | 31 | 40 | 70 | 59 |
| Discharge current, A | 0.5 | 0.5 | 0.5 | 0.5 |
| Internal resistance, Ohm | 0.2 | 0.2 | 0.2 | 0.2 |
| Electrode surface, $cm^2$ | 3.7 | 3.7 | 3.7 | 3.7 |
| Mass of element, g | 1.7 | 1.7 | 1.5 | 1.3 |
| Specific energy, W · h/kg | 23 | 29 | 26 | 56 |
| Maximum specific power, kW/kg | 6.6 | 6.6 | 3.3 | 8.6 |

What is claimed is:

1. A capacitor having a double electric layer, including electrodes, at least one of the electrodes being polarizable, a separator and a molten electrolyte, wherein a stiffener is introduced into the composition of the molten electrolyte.

2. The capacitor having a double electric layer according to claim 1, wherein as the stiffener is used an inert, fine disperse material introduced into the electrolyte.

3. The capacitor having a double electric layer according to any of claims 1–2, wherein as the stiffener is used a fine dispersed material on the basis of oxides, or mixed oxides, nitrides of aluminum, or magnesium, or calcium, or strontium, or boron, or silicon, or zirconium, or yttrium, or beryllium, or mixtures thereof.

4. The capacitor having a double electric layer according to claim 1, wherein the molten electrolyte comprises halogenides of elements of the first, or second, or third groups of the main subgroup of the periodic system, or mixtures thereof.

5. The capacitor having a double electric layer according to claim 1, wherein one of the electrodes is non-polarizable and comprises, as an active material, substances capable to oxidize and reduce reversibly in electro-chemical manner in an environment of the molten electrolyte.

6. The capacitor having a double electric layer according to claim 5, wherein the non-polarizable electrode comprises, as the active material, metals of the first, or second, or third groups of the periodic system, or mixtures thereof, or their alloys with carbon, or silicon, or boron, or other metals.

7. The capacitor having a double electric layer according to claim 5, wherein the non-polarizable electrode comprises, as the active material, sulfides or oxides of metals from group of iron, or group of vanadium, or group of chrome, or group of copper, or mixtures thereof.

* * * * *